Patented Dec. 18, 1951

2,578,721

UNITED STATES PATENT OFFICE 2,578,721

FLUORINATION OF SATURATED HALOCARBONS WITH MANGANESE TRIFLUORIDE

Earl T. McBee, La Fayette, Ind., and Richard M. Robb, Wilmington, Del., assignors to Purdue Research Foundation, La Fayette, Ind., a corporation of Indiana No Drawing. Application December 29, 1945, Serial No. 638,450

5 Claims. (Cl. 260—648)

This invention relates to organic compounds containing fluorine, particularly to saturated fluorine-containing halocarbons, and to a method for the preparation thereof. This application is a continuation in part of application Serial No. 596,421, filed May 28, 1945, now abandoned.

The preparation of fluorine-containing halocarbons, i. e., of fluorine-containing compounds composed entirely of carbon and halogen, has, in most instances, heretofore been attended with considerable difficulty. It is well known that elemental fluorine generally may not be reacted with organic compounds, even with halohydrocarbons containing a low proportion of hydrogen, and the reaction controlled so as to produce a desired flourine-containing halocarbon. Although certain halogens other than fluorine, e. g., chlorine and bromine, may react with a wide variety of organic compounds under suitable conditions to give high yields of valuable products, the reaction of fluorine with most organic compounds is violent in nature and is usually accompanied by profound decomposition of the organic compound. In most cases, reaction occurs with explosive violence in spite of extreme measures which may be taken to moderate its effect. In many instances the reaction products consist mainly of carbonaceous matter and hydrogen fluoride or of other equally undesirable products. When using a large excess of fluorine the principal products are generally carbon tetrafluoride and hydrogen fluoride.

Many attempts have been made to use fluorinating agents other than elemental fluorine to replace halogen or hydrogen in organic compounds to obtain desired fluorine containing compounds, e. g., fluorine-containing halocarbons. Among the fluorinating agents which have been tried may be mentioned hydrogen fluoride, antimony trifluoride, mercuric fluoride, iodine, trifluoride, bromine trifluoride, chlorine trifluoride, and many others. Although certain of these agents may, under certain conditions, replace with fluorine a certain proportion of an existing halogen atom other than fluorine already in a halocarbon molecule, many of these agents are in general expensive to prepare and inconvenient to work with. Furthermore, highly fluorinated compounds, e. g., perfluorinated compounds, are not usually obtained readily from the corresponding highly chlorinated, brominated or iodinated compounds using such agents. Certain of the agents referred to, e. g., bromine trifluoride, react with many organic compounds with explosive violence.

Most metal fluorides heretofore proposed as agents to replace chlorine, bromine or iodine in organic compounds with fluorine tend, under the conditions necessary to obtain a high degree of exchange of halogen, to produce polymerized or unsaturated break-down products and frequently do not lead to complete or uniform replacement of chlorine, bromine or iodine with fluorine. For these and other reasons fluorine-containing halocarbons have not heretofore been available except in a few instances, and industry has been deprived of many members of this valuable group of compounds. The need for new and improved procedures for the preparation of fluorine-containing halocarbons is evident.

It is therefore an object of the present invention to provide a method for the preparation of fluorine-containing halocarbons. Still a further object is to provide a method whereby saturated fluorine-containing halocarbons, including fluorocarbons, may be prepared from completely chlorinated, brominated or iodinated saturated hydrocarbons. An additional object is to provide a method whereby fluorine-containing halocarbons may be prepared from completely halogenated hydrocarbons containing two or more different halogens. An additional object is to provide a method for increasing the fluorine content of a halocarbon containing fluorine and another halogen. An additional object is to provide a method for preparing a fluorine-containing halocarbon whereby the formation of undesirable decomposition or polymerization products is substantially avoided. An additional object is to provide a method for fluorinating a halocarbon containing a halogen other than fluorine whereby a predetermined degree of fluorination may be effected readily. An additional object is to provide a fluorination method which is not subject to certain of the disadvantages set forth above. Still a further object is to provide a novel fluorinating agent capable of replacing established halogen other than fluorine in halocarbons with fluorine. Still an additional object is to provide certain new and novel fluorine-containing halocarbons, including fluorocarbons and other highly fluorinated products. Other objects will become apparent from the following specification and claims.

According to the present invention the foregoing and related objects are accomplished readily and economically by contacting a saturated halocarbon containing in the molecule at least one atom of halogen other than fluorine with manganese trifluoride under suitable reaction conditions until a desired degree of replacement with fluorine of said halogen other than fluorine has occurred, and separating from the reaction mixture a halocarbon containing at least a higher proportion of fluorine than the halocarbon treated. Manganese trifluoride has been found to be an excellent fluorinating agent for replacing with fluorine halogen other than fluorine in saturated halocarbons and, when the fluorination reaction is carried out under conditions hereinafter described, the reaction can be controlled without difficulty.

Substantially any desired proportion of the maximum theoretical amount of fluorine can be introduced into the halocarbon with the formation of little or no decomposition or polymerization products. Saturated aliphatic, and alicyclic halocarbons, including fused-ring halocarbons and polycarbocyclic non-fused-ring halocarbons, can be converted readily to fluorine-containing halocarbons. Chlorine, bromine and iodine present in the halocarbon reactant can be replaced partially or completely with fluorine, as desired. Examples of saturated fluorine-containing halocarbons containing at least one halogen atom other than fluorine which may be prepared by the method of the invention include monochlorotrifluoromethane, dichlorodifluoromethane, trichloromonofluoromethane, tetrachlorodifluoroethane, dichlorotetrafluoroethane, monobromomonochlorotetrafluoroethane, monobromopentafluoroethane, dichlorodecafluorocyclohexane, dichlorotetradecafluoroheptane, pentafluoromonoiodoethane, undecachloroundecafluorobicyclohexyl, dichlorohexadecafluoronaphthalane and many others. Saturated fluorine-containing halocarbons containing at least one halogen atom other than fluorine in the molecule, such as those just mentioned may be fluorinated to form saturated halocarbons of increased fluorine content, including fluorocarbons, if desired.

According to one modification of the present invention, perfluorination may be accomplished and saturated fluorocarbons, i. e., saturated compounds containing only carbon and fluorine, may be obtained by contacting a saturated halocarbon containing at least one atom of halogen other than fluorine in the molecule with manganese trifluoride as an active fluorinating agent under such conditions and for such time that all of such halogen other than fluorine in the molecule is replaced by fluorine. Examples of fluorocarbons which may be prepared by such perfluorination procedure include carbon tetrafluoride, hexafluoroethane, dodecafluoropentane, dodecafluorocyclohexane, tetradecafluoromethylcyclohexane, perfluorobicyclohexyl, perfluoronaphthalane, and many others.

In certain instances rupture of the molecule may be effected with the formation of saturated fluorine-containing halocarbons having fewer carbon atoms in the molecule than does the original halocarbon fluorinated. This is herein referred to as fluorinolysis. Thus, high molecular weight saturated halocarbons may, for example, be converted largly to high molecular weight fluorine-containing halocarbons, to high molecular weight saturated fluorocarbons, or, under more vigorous reaction conditions, to saturated fluorine-containing halocarbons or fluorocarbons having fewer carbon atoms in the molecule, such as hexafluoroethane and even carbon tetrafluoride, if desired.

Although the fluorination reaction is exothermic, it proceeds without explosive violence and may be controlled readily so as to produce a halocarbon containing substantially any desired proportion of fluorine. The fluorination reaction is carried out at a temperature between about 50° C., or somewhat lower, and about 600° C., or somewhat higher, preferably between about 100° C. and about 550° C.

During the course of the reaction, the manganese trifluoride used as a fluorinating agent is converted to manganese difluoride from which manganese trifluoride may be regenerated readily by exposing the difluoride to elemental fluorine at an elevated temperature. The reaction may thus be carried out in cyclical manner, the manganese trifluoride being first contacted with a saturated halocarbon reactant to produce a desired saturated fluorine-containing halocarbon and the spent manganese trifluoride, consisting largely of manganese difluoride, then regenerated with elemental fluorine and the cycle repeated. Furthermore, it may be desirable in some instances when a highly fluorinated saturated halocarbon is desired, to effect only partial fluorination in the first passage of the halocarbon reactant through the fluorination reactor and then to recycle the fluorine-containing product over regenerated or fresh manganese trifluoride to increase the proportion of fluorine in the halocarbon molecule. Recycling of the fluorine-containing halocarbon as well as of the manganese fluoride may be continued until a fluorocarbon is obtained, if desired.

Manganese trifluoride is a solid which is unstable in the presence of water or of atmospheric moisture. The compound is substantially stable, when dry, at temperatures as high as 500° C. and higher. Manganese trifluoride may be prepared readily in a number of ways, one convenient way being by the treatment of anhydrous manganese difluoride with elemental fluorine at an elevated temperature, e. g., at a temperature above about 200° C. preferably at a temperature between about 350° C. and about 500° C. Manganese difluoride may be prepared readily by treating anhydrous manganese dichloride with anhydrous hydrogen fluoride at temperatures above about 200° C. and in many other ways.

In practicing the invention it has been found convenient to place anhydrous manganese difluoride in the reaction vessel in which the subsequent fluorination of a halocarbon is to be carried out, and then to treat the manganese difluoride in the vessel with elemental fluorine under the said requisite conditions of temperature. Following the fluorination of a saturated halocarbon, the spent manganese trifluoride, which contains a large proportion of manganese difluoride, may be regenerated and the difluoride reconverted to the trifluoride by passing elemental fluorine over it at an elevated temperature. Thus, the consumption of manganese salts in the process is reduced to a minimum and consists only of such negligible quantities as may be lost mechanically during the process.

Fluorination of a saturated halocarbon with manganese trifluoride may be carried out in any convenient manner and in any convenient type of apparatus. It has been found satisfactory to dispose the manganese trifluoride in a thin layer, e. g., in a layer from about one-half to about one inch thick, on shelves or trays within the reaction vessel or directly on the floor of the vessel itself and to pass the halocarbon in vapor form through the vessel. The process is frequently carried out by distributing a shallow layer of manganese trifluoride throughout the length of a metal tube and passing a saturated halocarbon in vapor form through the tube. If desired, tubes with rectangular cross section may be used and the exposed surface of the layer of manganese trifluoride thus increased. The mass may be agitated, if desired. The physical form of the manganese trifluoride is preferably such that easy penetration of the mass of trifluoride by gases or vapors passing through the reaction vessel is facilitated. Granulated or coarsely powdered manganese trifluoride has been found to be satisfactory.

The reaction vessel, which may be of iron, nickel or other material resistant to the reactants and reaction products under the conditions of fluorination and regeneration, is maintained at a desired reaction temperature by any convenient means. Heating may be effected in any one of a number of ways, such as by electrical resistance heaters, by gas flames, or by immersing the reaction vessel in a suitable high-boiling liquid, such as a low-melting alloy. The fluorination reaction is exothermic in nature and in large size reaction vessels heating may not be necessary after the reaction has started. In some instances cooling may even be advisable.

Fluorination of a saturated halocarbon with manganese trifluoride may be carried out with the halocarbon reactant in either liquid or gaseous phase. In practice, however, it has usually been found more convenient, especially when high temperatures are required, to pass the halocarbon reactant through the reactor in vapor form. In this way the handling of organic liquids at high temperatures is avoided and the reaction may be carried out at ordinary pressures. A saturated halocarbon reactant may be introduced into the reaction vessel either in the form of its vapor or as a liquid. In the latter instance the halocarbon is usually vaporized in the portion of the reaction vessel nearest the entry port and the vapors are then fluorinated as they pass through the remaining part of the vessel. In certain instances, the halocarbon reactant may be heated in a vessel separate from the fluorination vessel, a stream of inert gas, such as nitrogen, hydrogen fluoride, or helium, passed into the heated liquid, and the mixed vapors of inert gas and of saturated halocarbon reactant then passed through the fluorination vessel. Fluorination with the halocarbon reactant in the vapor phase is conveniently carried out at atmospheric pressure although it may, if desired, be carried out at a pressure higher or lower than atmospheric pressure.

Although fluorination of a saturated halocarbon in the vapor phase using manganese trifluoride as the active fluorinating agent is usually carried out at a temperature between about 50° C. and about 600° C., it may be carried out at any convenient temperature above the condensing temperature of the vapors at the reaction pressure. In certain instances the temperature of fluorination may even be maintained sufficiently high to cause fluorinolysis of the halocarbon reactant. Temperatures sufficiently high to cause the formation of substantial amounts of undesirable by-products are to be avoided.

After the manganese trifluoride has been largely exhausted and converted substantially to manganese difluoride the reaction vessel may be purged with nitrogen or other inert gas to free it from most of the organic substances before elemental fluorine is admitted to the reaction vessel to regenerate manganese trifluoride. In this way the possible explosive reaction of residual organic vapor with elemental fluorine within the reaction vessel is avoided. Regeneration of the spent manganese trifluoride is, as noted above, carried out at a temperature above about 200° C., preferably at a temperature between about 350° C. and about 500° C.

As mentioned previously the process of the invention may, if desired, be carried out with the saturated halocarbon reactant in the liquid phase in which case the halocarbon and manganese trifluoride may be mixed together in any convenient way, e. g., the halocarbon may be stirred in a vessel at the desired temperature and manganese trifluoride added gradually thereto. Such procedure with the halocarbon reactant in the liquid phase is of particular value when the halocarbon boils at a high temperature. It has been found that the ratio of the amount of manganese trifluoride to the amount of saturated halocarbon reactant necessary when a high degree of fluorination is to be effected is so great that, when the reaction is carried out with the halocarbon reactant in liquid phase, the final reaction mixture is frequently of a moist granular nature rather than of a fluid nature and is difficult to handle on a large scale. This difficulty may be overcome in a number of ways. Thus the liquid which is to be fluorinated may be diluted with a liquid inert under the reaction conditions, such as a high boiling fluorocarbon, to increase the proportion of liquid in the reaction mixture.

Alternatively, fluorination in the liquid phase may be carried out step-wise. Thus in the first step the addition of solid manganese trifluoride to the liquid halocarbon reactant may be stopped while the mixture is still fluid enough to be agitated readily. The reaction product may be filtered or otherwise treated to separate the organic and inorganic portions thereof, the spent manganese trifluoride regenerated with fluorine, and the partially fluorinated organic portion then fluorinated further by adding to it fresh or regenerated manganese trifluoride. Although the invention is not limited to vapor phase procedures, it is readily apparent that in many instances the fluorination reaction is more conveniently carried out in vapor phase.

The degree of fluorination effected is dependent, among other factors, upon the reaction temperature and the time of contact of the halocarbon reactant with manganese trifluoride. In order to effect a high degree of fluorination, e. g., perfluorination, of a saturated halocarbon in the vapor phase during a single pass through the reaction vessel, it may be necessary to pass the halocarbon vapor very slowly through the vessel thus limiting the rate at which a highly fluorinated product may be produced in any particular reaction vessel. It has also been found that many halocarbons are somewhat more thermally unstable in the unfluorinated or only lowly fluorinated state than when they are more highly fluorinated and that, when it is attempted to fluorinate such unfluorinated or lowly fluorinated halocarbons to produce a highly fluorinated halocarbon during a single pass of the vapor through the fluorination vessel, it may be necessary to elevate the temperature to such a degree that undesirable decomposition of the halocarbon reactant may occur before substantial fluorination is effected.

For these and other reasons it is sometimes convenient and desirable to recycle the halocarbon reactant after it has been partially fluorinated, usually after the spent manganese trifluoride has been regenerated to insure there being a high proportion of manganese trifluoride in the manganese fluoride mass. This recycling of the organic product may be repeated as many times as is desirable or necessary to introduce the desired proportion of fluorine into the molecule and each recycling is preferably, but not necessarily, carried out at a temperature higher than the preceding one. In this way the first stages of fluorination, which do not require high temperatures and during which relatively unstable halocarbons may be present in the fluorination vessel, are carried out at a relatively low temperature while later stages of fluorination, which usually require a higher temperature and during which only relatively stable fluorine-containing halocarbons are present in the fluorination vessel, are carried out at a higher temperature. The same effect may be obtained by passing the halocarbon reactant through a number of reaction vessels or towers in series each containing manganese trifluoride and each maintained at a reaction temperature which may, if desired, be higher than that of the preceding vessel. By a suitable arrangement of a number of reaction vessels in series the process may be carried out continuously, it being only necessary to by-pass the vapors of the halocarbon reactant around any one of the reaction vessels while the spent manganese trifluoride therein is being regenerated with fluorine.

It is to be noted that a chlorine, bromine or iodine atom replaced with a fluorine atom during the fluorination appears in the reaction product in elemental form. The effluent vapors from the reaction thus contain, in addition to the desired saturated fluorine-containing halocarbon, a halogen other than fluorine, and may contain unfluorinated or partially fluorinated saturated halocarbon reactant.

The reaction product is treated in any convenient manner to recover therefrom the desired saturated fluorine-containing halocarbon. One convenient way in the case of vapor phase fluorination consists in cooling and condensing the effluent vapors and treating the condensed liquid to separate therefrom the desired saturated fluorine-containing halocarbon. The liquid reaction product may be treated in any one of a number of ways. Thus the liquid may be fractionally distilled and the desired fraction collected, or it may be treated directly with a dilute aqueous alkali to free it from elemental halogen and then fractionally distilled. In any event the desired fluorine-containing fraction may be collected and any less highly fluorinated fraction may, if desired, be recycled to the fluorination reaction vessel to increase the proportion of fluorine in the fraction.

In the case of fluorination with the saturated halocarbon reactant in the liquid state, the reaction mixture may be filtered or otherwise treated to separate the organic and inorganic constituents. The inorganic constituents, consisting mainly of spent manganese trifluoride, may be dried, or washed with a low boiling organic liquid and dried, and then regenerated with elemental fluorine and recycled in the process. The organic constituents may be washed with water and with dilute aqueous alkali to free them from elemental halogen and the mixture then fractionally distilled. Inert liquid diluents and insufficiently fluorinated halocarbons collected during the distillation may be returned, either together or separately, to the fluorination vessel and the fluorine content of the insufficiently fluorinated halocarbon increased by further treatment with fresh or regenerated manganese trifluoride. Other ways of recovering the desired fluorine-containing halocarbon from the reaction mixture will be apparent to those familiar with the art and the present invention is not limited as to such methods of recovery.

Certain advantages of the invention are apparent from the following examples, which are included by way of illustration only and are not to be construed as limiting.

*Example 1*

About 5 mols of anhydrous manganese dichloride was placed in a metal reactor and anhydrous hydrogen fluoride passed slowly through the reactor for several hours at 250° C. Elemental fluorine was then passed slowly through the reactor for five hours, the temperature being raised gradually to 350° C. The manganese trifluoride so prepared was used without removal from the reactor in subsequent fluorination reactions.

*Example 2*

One hundred grams of a mixture of a pentachlorotrifluoropropanes is vaporized and passed through a reactor containing an excess of manganese trifluoride heated at about 300° C. Effluent vapors from the reactor are passed through a cooled receiver to condense organic products therein. The condensed liquid is washed with water and dilute alkali and fractionally distilled. Fractions are obtained containing substantial proportions of dichlorohexafluoropropane, trichloropentafluoropropane, and tetrachlorotetrafluoropropane.

The fractions of chlorofluoropropanes just described are each vaporized and recycled through a reactor packed with manganese trifluoride at a temperature of about 350° C. In each case products are obtained having a higher fluorine content and a lower chlorine content than the fraction fluorinated. Fractions of perfluoropropane are obtained in each case.

*Example 3*

Dichlorodecafluorocyclohexane is vaporized and passed through a reactor containing manganese trifluoride at a temperature of about 425° C. The effluent vapors are cooled to condense organic substances therein and the condensate washed and fractionally distilled. Fractions are obtained corresponding to monochloroundecafluorocyclohexane and perfluorocyclohexane.

*Example 4*

Hexachlorododecafluorodecahydronaphthalene is added to a reactor containing manganese trifluoride at a temperature of about 425° C. After several hours the reactor is purged with nitrogen to remove most of the organic material, the effluent vapors from the entire process being cooled in a receiver. The organic product thus collected is found to consist of a chlorofluorodecahydronaphthalene product having a higher percentage of fluorine and a lower percentage of chlorine than the original product fluorinated. Upon fractionally distilling the product, fractions are obtained having compositions corresponding to tetrachlorotetradecafluorodecahydronaphthalene and trichloropentadecafluorodecahydronaphthalene.

Each of these latter substances upon fluorination with manganese trifluoride at a temperature of about 425° C. yields a product containing a substantial proportion of perfluorodecahydronaphthalene.

*Example 5*

A reactor containing manganese trifluoride was heated at 200° C. Hexachloroethane was placed in a flask, heated at 180° C. and a slow stream of nitrogen passed through the flask. The mixture of nitrogen and hexachloroethane vapor was passed directly from the flask through the manganese trifluoride reactor. A solid product, which issued in vapor form from the reactor, was collected in a cooled receiver. This product was dissolved from the receiver with carbon tetrachloride and the solution was washed thoroughly, dried, and fractionally distilled. After the carbon tetrachloride had distilled, a small fraction of a liquid product was obtained boiling at 80° to 93° C. A subsequent fraction was obtained boiling at 135° to 170° C. This fraction was principally pentachloromonofluoroethane.

We claim:

1. The process for the replacement, with fluorine, of all halogen atoms other than fluorine, in a saturated polycarbon compound containing only carbon and halogen with retention of the carbon structure of the molecule, which includes the steps of (1) vaporizing a saturated polycarbon compound containing only carbon and halogen and containing at least one halogen atom other than fluorine, (2) maintaining solid manganese trifluoride in a reaction zone at a temperature between about 200 and 600 degrees centigrade, (3) causing the vapor of the saturated halocarbon and manganese trifluoride to react with replacement, with fluorine, of all halogen atoms other than fluorine in the molecule of the saturated halocarbon, and (4) condensing from the effluent product a saturated polycarbon compound containing only carbon and fluorine and having the same carbon structure as the starting material wherein all halogen atoms other than fluorine have been replaced with fluorine.

2. The process of claim 1, wherein effluent product containing halogen atoms other than fluorine is recycled at a temperature between 200 and 600 degrees centigrade in contact with manganese trifluoride until all of the halogen other than fluorine therein is replaced with fluorine, and wherein a saturated compound containing only carbon and fluorine and having the same carbon structure as the starting halocarbon is condensed from the final effluent product.

3. The process of claim 1, wherein the starting saturated polycarbon halocarbon is a chlorofluoropropane.

4. The process of claim 1 wherein the starting saturated polycarbon halocarbon is a cyclic halocarbon.

5. The process of claim 1, wherein the starting polycarbon halocarbon is a chlorofluorocyclohexane.

EARL T. McBEE.
RICHARD M. ROBB.

REFERENCES CITED

The following references are of record in the file of this patent:

UNITED STATES PATENTS

| Number | Name | Date |
|---|---|---|
| 2,013,035 | Daudt et al. | Sept. 3, 1935 |
| 2,024,008 | Midgley et al. | Dec. 10, 1935 |
| 2,062,743 | Daudt et al. | Dec. 1, 1936 |
| 2,192,143 | Midgley et al. | Feb. 27, 1940 |
| 2,220,713 | Grosse et al. | Nov. 5, 1940 |
| 2,238,242 | Balon et al. | Apr. 15, 1941 |
| 2,423,045 | Passino et al. | June 24, 1947 |

FOREIGN PATENTS

| Number | Country | Date |
|---|---|---|
| 214,293 | Great Britain | Apr. 14, 1924 |
| 429,591 | Great Britain | May 28, 1935 |
| 3141/31 | Australia | Jan. 20, 1933 |
| 786,123 | France | June 3, 1935 |

OTHER REFERENCES

Henne et al., "J. A. C. S.," vol. 63, pages 3478–3479 (1941).

Moissan, "Comptes rendus," vol. 130, pages 622–627 (1900).

Olsson, "Zeitschr, Anorg. Allgem. Chem.," vol. 187, pages 313–320 (1930).

Ruff and Giese, "Zeit. Anorg. Allgem. Chem.," vol. 219, pages 143–148 (1934).